United States Patent
Unger et al.

(10) Patent No.: US 8,284,791 B2
(45) Date of Patent: Oct. 9, 2012

(54) SYSTEMS AND METHODS FOR LOAD BALANCING OF MANAGEMENT TRAFFIC OVER A LINK AGGREGATION GROUP

(75) Inventors: Stephen John Unger, Allen, TX (US); David Joseph Haas, Mahwah, NJ (US); Nimer Yaseen, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 12/781,080

(22) Filed: May 17, 2010

(65) Prior Publication Data

US 2011/0280124 A1    Nov. 17, 2011

(51) Int. Cl.
    H04L 12/28 (2006.01)
(52) U.S. Cl. ......................... 370/419; 370/421
(58) Field of Classification Search .................. 370/359, 370/360, 362, 364, 401, 402, 419, 420, 421, 370/423
    See application file for complete search history.

(56) References Cited

U.S. PATENT DOCUMENTS

| | | | |
|---|---|---|---|
| 6,910,149 B2 * | 6/2005 | Perloff et al. ................... | 714/4.3 |
| 7,697,525 B2 * | 4/2010 | Zelig et al. ..................... | 370/390 |
| 7,756,029 B2 * | 7/2010 | Licardie et al. ............. | 370/230.1 |
| 7,912,091 B1 * | 3/2011 | Krishnan et al. .............. | 370/490 |

* cited by examiner

Primary Examiner — Brenda H Pham
(74) Attorney, Agent, or Firm — Baker Botts L.L.P.

(57) ABSTRACT

According to one embodiment, a method includes configuring a plurality ports as member ports of a link aggregation group. The method also includes configuring the link aggregation group to communicate management traffic originating from a plurality of maintenance entities communicatively coupled to the link aggregation group communicate carrier traffic originating from other network elements communicatively coupled to the link aggregation group. The method further includes assigning individual maintenance entities of the plurality of maintenance entities to individual physical ports of the link aggregation group in order to balance maintenance traffic among the plurality of physical ports.

22 Claims, 4 Drawing Sheets

```
LAG::rebalance() { // Use single Rebalance Algorithm for all cases
int avgPortBw = totalMepBw/numActivePorts;
int numberOfMepsMoved = 0;
int maxMepMove = 40; // For scalability issues, only move max number MEPs per polling timer
while (numberOfMepsMoved < maxMepMove &&
       !allPortsAvgBw(avgPortBw)) { // All ports should have same B/W +- 1 Mbps rounding function
{
    int fromLagport = findHighestUtilizedLagport();      // This port has too many MEPs
    int toLagPort = findLowestUtilizedLagport();         // This port has too few MEPs
    MEP *mep = getHighestIntervalMep(fromLagport); // Less MEP moves if take largest interval
    moveMep(mep,fromLagport,toLagPort);            // Move this MEP and continue to next MEP
    ++numberOfMepsMoved;
}
}
```

SYSTEMS AND METHODS FOR LOAD BALANCING OF MANAGEMENT TRAFFIC OVER A LINK AGGREGATION GROUP

TECHNICAL FIELD

This invention relates generally to the field of communications systems and more specifically to load balancing of management traffic in a link aggregation group.

BACKGROUND

A communication network includes network elements that route packets through the network, predominantly in line card hardware. Network packets may comprise carrier traffic and management traffic. Carrier traffic is typically data communicated by users of the communication network. On the other hand, management traffic is typically traffic associated with a provider of the communication network used for provisioning network equipment, tracking network status, monitoring alarms, and other network management functionality. Both carrier traffic and management traffic are communicated over the same physical medium using the same interfaces.

In many instances, communication networks may employ link aggregation. Link aggregation (e.g., IEEE 802.1AX-2008) may generally describe the practice of using multiple network cables or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

Despite the functional advantages of LAGs, LAGs may present challenges to communication of carrier traffic and management traffic. For example, carrier traffic is often load balanced among the various member ports of a LAG by using hashing algorithms or other methods for distributing such traffic across a LAG's member ports. However such hashing algorithms or load-balancing methods may not be conducive to flow of management traffic. To illustrate, if carrier traffic is Internet Protocol (IP)-based, and management traffic is based on standard multicast Media Access Control (MAC), all management traffic may default to the same physical port of a LAG. Because management traffic may consume large bandwidth (e.g., presence messages such as continuity check messages (CCMs) with fast timers), a dedicated physical port for all management traffic of a LAG may lead to bottlenecks, slow performance, and other undesirable effects.

SUMMARY OF THE DISCLOSURE

In accordance with the present invention, disadvantages and problems associated with communication of management traffic in a link aggregation group may be reduced or eliminated.

According to one embodiment, a method includes configuring a plurality ports as member ports of a link aggregation group. The method also includes configuring the link aggregation group to communicate management traffic originating from a plurality of maintenance entities communicatively coupled to the link aggregation group communicate carrier traffic originating from other network elements communicatively coupled to the link aggregation group. The method further includes assigning individual maintenance entities of the plurality of maintenance entities to individual physical ports of the link aggregation group in order to balance maintenance traffic among the plurality of physical ports.

Certain embodiments of the invention may provide one or more technical advantages. A technical advantage of certain embodiment may be that management traffic may be more effectively communicated in link aggregation groups, as compared with traditional approaches.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which.

DETAILED DESCRIPTION OF THE DRAWINGS

Figure 1:
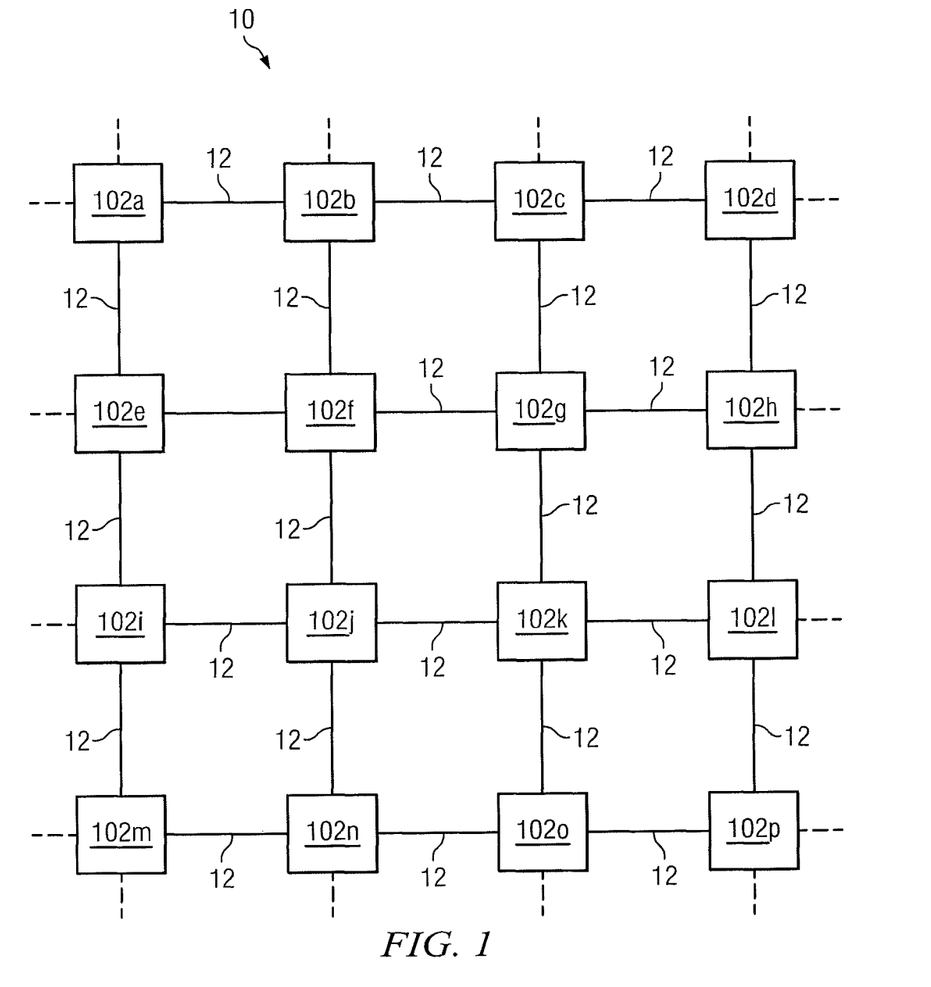
FIG. 1 illustrates a block diagram of an example network, in accordance with certain embodiments of the present disclosure.

Embodiments of the present invention and its advantages are best understood by referring to FIG. 1, like numerals being used for like and corresponding parts of the various drawings.

Embodiments of the present invention and its advantages are best understood by referring to FIGS. 1-8, like numerals being used for like and corresponding parts of the various drawings.

FIG. 1 illustrates a block diagram of an example network 10, in accordance with certain embodiments of the present disclosure. In certain embodiments, network 10 may be an optical network. Network 10 may include one or more transmission media 12 operable to transport one or more signals communicated by components of network 10. The components of network 10, coupled together by transmission media 12, may include a plurality of network elements 102 (e.g., network elements 102a-102p). In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium. In some embodiments, one or more transmission media 12 may be part of a link aggregation group (LAG), in which case multiple physical transmission media 12 may exist coupling network devices 102 despite the fact that the multiple transmission media 12 may logically appear as a single transmission medium to components of network 10 external to the LAG.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

In certain embodiments of system 100, one or more network elements 102 may include one or more services associated with a particular maintenance level. For example, according to relevant Service Operation, Administration, and Management ("Service OAM" or "SOAM") standards, associated network elements 102a and 102p may be associated with the Customer OAM Level (e.g., may be Maintenance Entity Group End Points (MEPs) of the Customer OAM Level). As another example, network elements 102f and 102k may be associated with the Provider OAM Level and/or Operator OAM Level. In such embodiments, heartbeat messages 114 (e.g., SOAM continuity check messages or "CCMs") may be communicated between network elements 102 at the same level (e.g., network elements 102a and 102p) in order to detect loss of continuity or improper network connections between such network element services. In various embodiments of network 10, network 10 may include numerous pairs of network elements 102 associated with each other at the SOAM level. For example, network elements 102a and 102p may be counterpart MEPs (e.g., MEPs of the same Maintenance End Group (MEG)), and network elements 102m and 102d may be counterpart MEPs (e.g., MEPs of the same Maintenance End Group (MEG)). Accordingly, network elements 102 intermediate to such MEP network elements 102 may forward management traffic between such MEPs.

Although the term "MEP" is used throughout this disclosure, the methods and systems discussed herein may also be applied to any other management and/or maintenance entities configured to communicate management traffic. Accordingly, when used in this disclosure, the term "maintenance entity" may be used to refer to any such management and/or maintenance entities configured to communicate management traffic, including without limitation a MEP.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
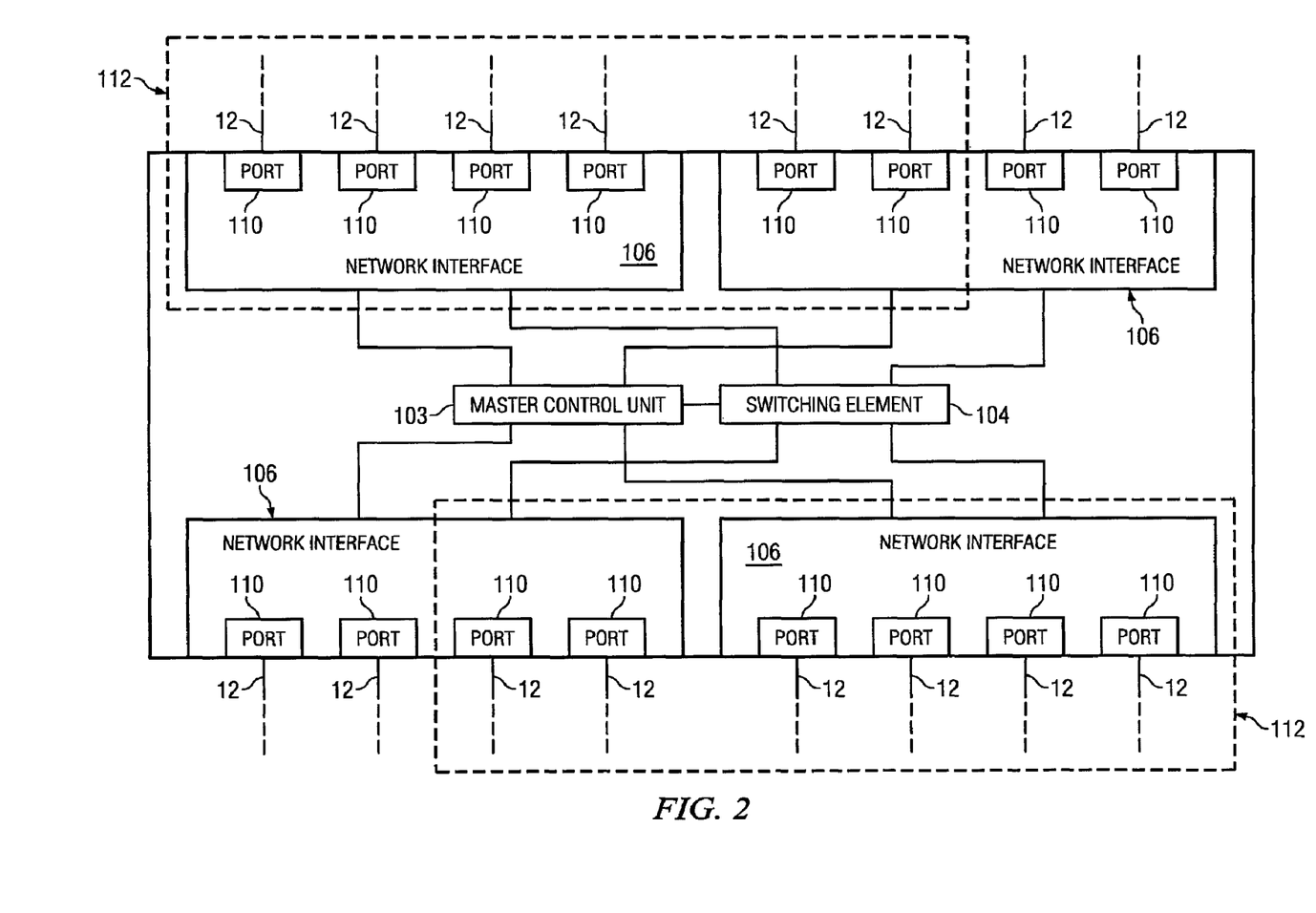
FIG. 2 illustrates a block diagram an example network element, in accordance with certain embodiments of the present disclosure.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. As shown in FIG. 2, master control unit 103 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 and/or link aggregation group (LAG) 112 to a corresponding egress port 110 and/or LAG 112.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port may comprise an Ethernet port, an optical port, or any other suitable port.

As shown in FIG. 2, two or more physical ports 110 of a particular network element 102, their corresponding physical ports 110 of another network element 102, and their corresponding transmission media 12 may be grouped into a link aggregation group (LAG) 112. Although each LAG 112 in FIG. 2 is depicted as including a particular number of member physical ports 110, LAG 112 may include any suitable number of member physical ports 110. LAG 112 may combine its member ports or member LAGs using link aggregation such that the member ports are represented as a single logical port to components of network 10 external to LAG 112.

In operation, master control unit 103 and/or another component of a network element 102 may be configured to load balance management traffic among physical ports 110 of LAGs 112 associated with the network element 102. For example, master control unit 103 may assign each physical port 110 of a LAG 112 to one or more MEPs, such that management traffic originating from such MEPs is balanced among such physical ports 110. Master control unit 103 and/or another component of a network element 102 may make such assignments based on any number of parameters associated with such MEPs, including the number of MEPs, the bandwidth requirements of such MEPs (e.g., interval times of continuity check messages (CCMs) and/or other messages originating from the individual MEPs). Master control unit 103 and/or another component of a network element 102 may be also configured to perform such load balancing based on events related to a LAG, including the addition of a MEP associated with the LAG 112, deletion of a MEP associated with the LAG 112, change in bandwidth of a MEP associated with the LAG 112, addition of a physical port 110 of the LAG 112, deletion of physical port 110 of the LAG 112, and/or other event. Such event-based load balancing is described in further detail below with reference to FIGS. 3-8.

Figure 3:
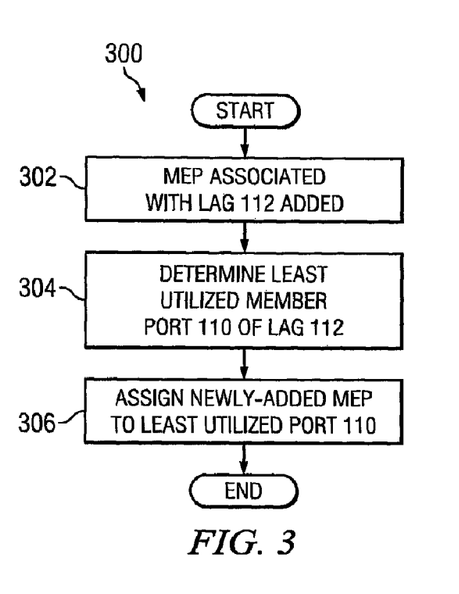
FIG. 3 distributing a flow chart of an example method for rebalancing management traffic among physical ports of a link aggregation group (LAG) in response to addition of a Maintenance Entity Group End Point (MEP) associated with the LAG, in accordance with certain embodiments of the present disclosure.

FIG. 3 illustrates a flow chart of an example method 300 for distributing management traffic among physical ports 110 of a LAG 112 in response to addition of a Maintenance Entity Group End Point (MEP) associated with the LAG 112, in accordance with certain embodiments of the present disclosure. According to one embodiment, method 300 may begin at step 302. As noted above, teachings of the present disclosure may be implemented in a variety of configurations of network 10. As such, the preferred initialization point for method 300 and the order of the steps 302-306 comprising method 300 may depend on the implementation chosen.

At step 302, a MEP or other management/maintenance entity associated with LAG 112 may be added. At step 304, master control unit 103 or another component of network element 102 may determine the least utilized member port 110 of LAG 112. At step 306, master control unit 103 or another component of network element 102 may assign the newly-added MEP to the least utilized port 110, such that management traffic associated with such MEP is routed through such port 110.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network 10 or any other system operable to implement method 300. In certain embodiments, method 300 may be implemented partially or fully in software and/or firmware embodied in computer-readable media.

Figure 4:
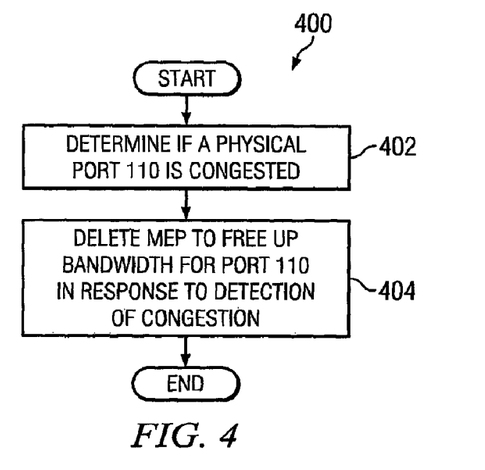
FIG. 4 illustrates a flow chart of an example method for distributing management traffic among physical ports of a LAG in response to deletion of a MEP associated with the LAG, in accordance with certain embodiments of the present disclosure.

FIG. 4 illustrates a flow chart of an example method 400 for distributing management traffic among physical ports 110 of a LAG 112 in response to deletion of a MEP associated with the LAG 112, in accordance with certain embodiments of the present disclosure. According to one embodiment, method 400 may begin at step 402. As noted above, teachings of the present disclosure may be implemented in a variety of configurations of network 10. As such, the preferred initialization point for method 400 and the order of the steps 402-404 comprising method 400 may depend on the implementation chosen.

Figure 8:
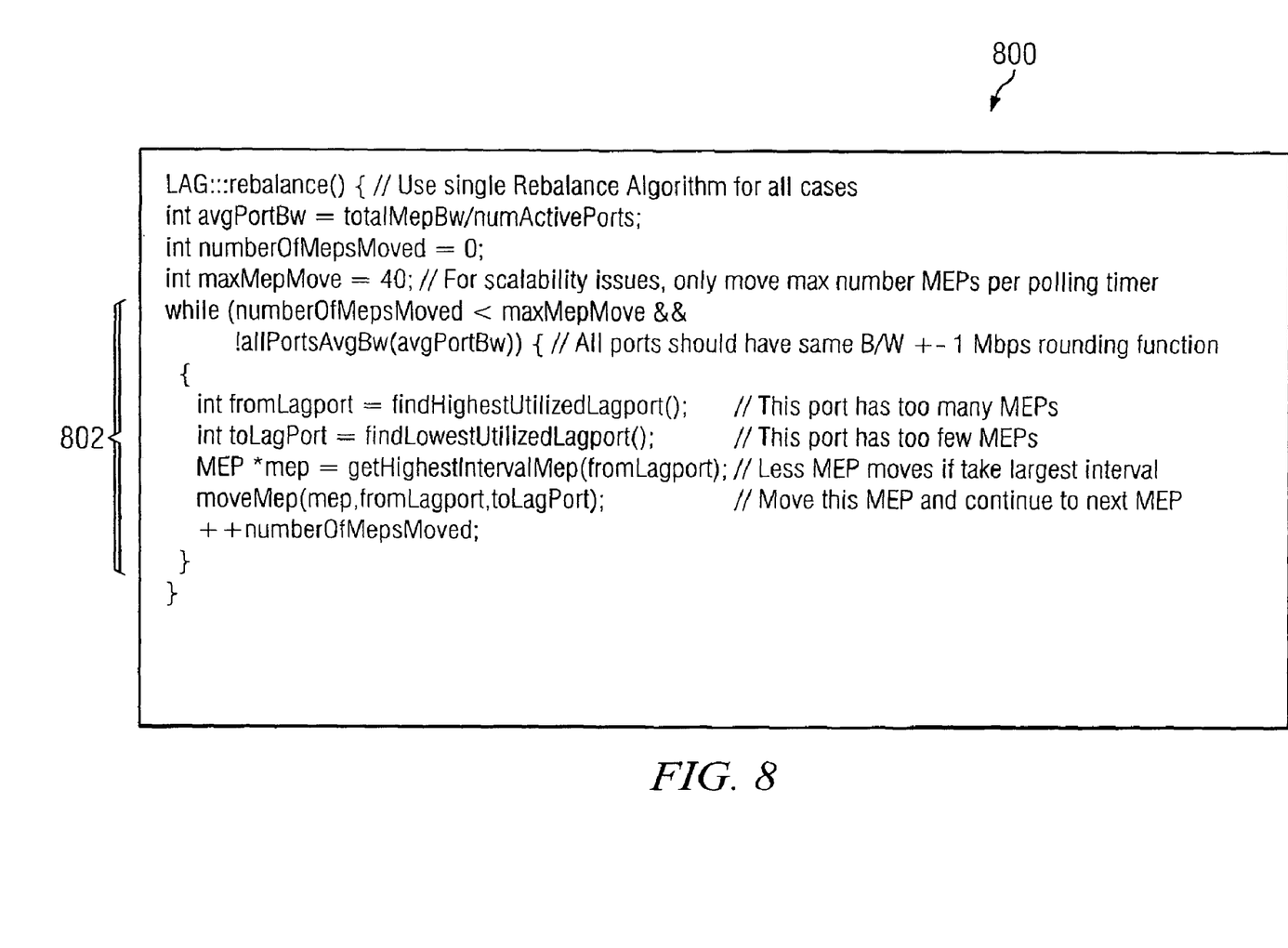
FIG. 8 illustrates an example algorithm for rebalancing management traffic among physical ports of a LAG, in accordance with certain embodiments of the present disclosure.

At step 402, master control unit 103, another component of network element 102, and/or a user/administrator may determine that a physical port 110 of a LAG 112 is congested (e.g., management traffic exceeding a predetermined amount through port 110, port 110 dropping traffic routed through port 110, etc.). At step 402, in response to a determination that a particular physical port is congested, a MEP associated with such port may be deleted automatically or manually by a user/administrator. Alternatively to deleting a MEP, MEPs may be rebalanced among member ports 110 of the LAG 112, such as depicted in FIG. 8, for example. Such rebalancing may cause the management traffic bandwidth among the various member ports 110 of the LAG to be substantially balanced and/or equal.

Although FIG. 4 discloses a particular number of steps to be taken with respect to method 400, method 406 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using network 10 or any other system operable to implement method 400. In certain embodiments, method 400 may be implemented partially or fully in software and/or firmware embodied in computer-readable media.

Figure 5:
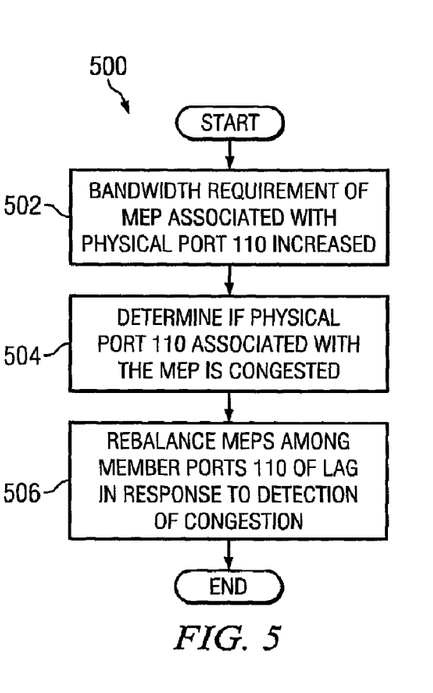
FIG. 5 illustrates a flow chart of an example method for distributing management traffic among physical ports of a LAG in response to a change in the bandwidth requirements of a MEP associated with the LAG, in accordance with certain embodiments of the present disclosure.

FIG. 5 illustrates a flow chart of an example method 500 for distributing management traffic among physical ports 110 of a LAG 112 in response to a change in the bandwidth requirements of a MEP associated with the LAG, in accordance with certain embodiments of the present disclosure. According to one embodiment, method 500 may begin at step 502. As noted above, teachings of the present disclosure may be implemented in a variety of configurations of network 10. As such, the preferred initialization point for method 500 and the order of the steps 502-506 comprising method 500 may depend on the implementation chosen.

At step 502, bandwidth requirements of a MEP associated with a physical port 110 of a LAG 112 may be increased. For example, a CCM interval for the MEP may be increased. At step 504, in response to the increase in bandwidth, master control unit 103, another component of network element 102, and/or a user/administrator may determine that the physical port 110 associated with the MEP (e.g., management traffic exceeding a predetermined amount through port 110, port 110 dropping traffic routed through port 110, etc.). At step 506, in response to a determination that a particular physical port is congested, master control unit 103 and/or another component of network element 102 may rebalance the assignment of MEPs among member ports 110, such as shown in FIG. 8, for example. Such rebalancing may cause the management traffic bandwidth among the various member ports 110 of the LAG to be substantially balanced and/or equal.

In some embodiments, a rebalancing operation (e.g., such as that shown in FIG. 8) may be performed in response to a change in the bandwidth requirements of a MEP (increase or decrease), regardless of whether such change leads to congestion in a particular member port 110.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using network 10 or any other system operable to implement method 500. In certain embodiments, method 500 may be implemented partially or fully in software and/or firmware embodied in computer-readable media.

Figure 6:
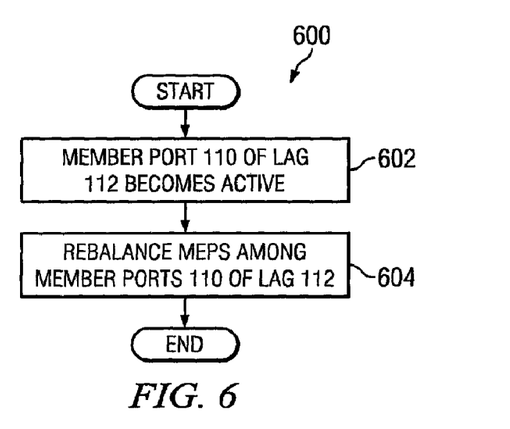
FIG. 6 illustrates a flow chart of an example method for distributing management traffic among physical ports of a LAG in response to addition of a physical port to the LAG, in accordance with certain embodiments of the present disclosure.

FIG. 6 illustrates a flow chart of an example method 600 for distributing management traffic among physical ports 110 of a LAG 112 in response to addition of a physical port 110 to the LAG 112 (e.g., such port 110 becoming "active"), in accordance with certain embodiments of the present disclosure. According to one embodiment, method 600 may begin at step 602. As noted above, teachings of the present disclosure may be implemented in a variety of configurations of network 10. As such, the preferred initialization point for method 600 and the order of the steps 602-604 comprising method 600 may depend on the implementation chosen.

At step 602, a member port 110 of a LAG 112 may become active. At step 604, in response to the additional member port 110 becoming active, master control unit 103 and/or another component of network element 102 may rebalance the assignment of MEPs among member ports 110 (including the newly-active member port 110), such as shown in FIG. 8, for example. Such rebalancing may cause the management traffic bandwidth among the various member ports 110 of the LAG to be substantially balanced and/or equal.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order.

Method 600 may be implemented using network 10 or any other system operable to implement method 600. In certain embodiments, method 600 may be implemented partially or fully in software and/or firmware embodied in computer-readable media.

Figure 7:
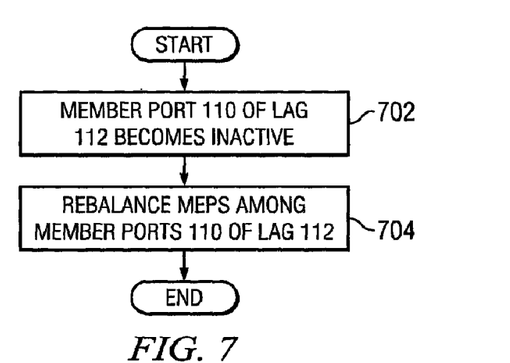
FIG. 7 illustrates a flow chart of an example method for distributing management traffic among physical ports of a LAG in response to deletion of a physical port from the LAG, in accordance with certain embodiments of the present disclosure.

FIG. 7 illustrates a flow chart of an example method 700 for distributing management traffic among physical ports 110 of a LAG 112 in response to deletion of a physical port 110 from the LAG 112 (e.g., such port 110 becoming "inactive"), in accordance with certain embodiments of the present disclosure. According to one embodiment, method 700 may begin at step 702. As noted above, teachings of the present disclosure may be implemented in a variety of configurations of network 10. As such, the preferred initialization point for method 700 and the order of the steps 702-704 comprising method 700 may depend on the implementation chosen.

At step 702, a member port 110 of a LAG 112 may become inactive. At step 704, in response to the member port 110 becoming inactive, master control unit 103 and/or another component of network element 102 may rebalance the assignment of MEPs among member ports 110 (not including the newly-inactive member port 110), in a manner similar to that shown in FIG. 8, for example. Such rebalancing may cause the management traffic bandwidth among the various member ports 110 of the LAG to be substantially balanced and/or equal.

Although FIG. 7 discloses a particular number of steps to be taken with respect to method 700, method 700 may be executed with greater or lesser steps than those depicted in FIG. 7. In addition, although FIG. 7 discloses a certain order of steps to be taken with respect to method 700, the steps comprising method 700 may be completed in any suitable order.

Method 700 may be implemented using network 10 or any other system operable to implement method 700. In certain embodiments, method 700 may be implemented partially or fully in software and/or firmware embodied in computer-readable media.

FIG. 8 depicts, in C++-style pseudocode, an example algorithm 800 for rebalancing management traffic among physical ports 110 of a LAG 112, in accordance with certain embodiments of the present disclosure. As is seen in FIG. 8, variables avgPortBw, numberOfMepsMoved, and maxMepMove may be initialized at commencement of the algorithm. Variable avgPortBw may represent the average bandwidth of management traffic in each member port 110 of a LAG 112, and may be initialized based on the total bandwidth for management traffic for the LAG 112 (totalMepBw) divided by the number of active member ports 110 (numActivePorts). Variable numberOfMepsMoved may be a counter tracking the number of MEPs reassigned from one member port 110 to another during execution of the algorithm, and thus may be initialized to zero. Variable maxMepMove may be a constant establishing the maximum number of MEPs to be reassigned from one member port 110 to another during execution of the algorithm. A maximum may be desirable for scalability reasons (e.g., such that a maximum number of MEPs are reassigned for each polling timer).

After variables are initialized, the algorithm may enter a "while loop" as indicated by reference number 802, wherein the loop will execute as long as the counter variable numberOfMepsMoved is less than the constant maxMepMove. To begin the while loop, a variable fromLagport, representing the member port 110 from which a MEP is to be de-assigned, is set to the member port 110 with the highest bandwidth/utilization requirements (using a function called findHighestUtilizedLagport( )). In addition, a variable toLagport, representing the member port 110 to which a MEP is to be assigned, is set to the member port 110 with the lowest bandwidth/utilization requirements (using a function called findLowestUtilizedLagport).

Next, a variable *mep, representing a MEP to be reassigned during the present iteration of the while loop, is set to the MEP using the most bandwidth (e.g., shortest CCM interval time) on the member port 110 with the highest bandwidth (using a function called getHighestIntervalMep). Such MEP may be reassigned to the lowest utilized member port 110 of the LAG 112 (using function called moveMep). After the MEP is reassigned, the present iteration of the while loop ends with the counter numberOfMepsMoved incremented.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that management traffic may be more effectively communicated in link aggregation groups.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
    one or more network interfaces including, in the aggregate, a plurality of physical ports configured as member ports of a link aggregation group, wherein the link aggregation group is:
        configured to communicate management traffic originating from a plurality of maintenance entities communicatively coupled to the link aggregation group; and
        configured to communicate carrier traffic originating from other network elements communicatively coupled to the link aggregation group; and
    logic communicatively coupled to the one or more network interfaces, the logic configured to assign individual maintenance entities of the plurality of maintenance entities to individual physical ports of the link aggregation group in order to balance maintenance traffic among the plurality of physical ports.

2. A network element according to claim 1, wherein the logic is further configured to balance management traffic among the plurality of physical ports such that the management traffic communicated via each physical port is substantially equal.

3. A network element according to claim 1, wherein at least one of the plurality of maintenance entities includes a Maintenance Entity Group End Point (MEP).

4. A network element according to claim 1, wherein the logic is further configured to reassign individual maintenance entities of the plurality of maintenance entities to individual physical ports of the link aggregation group in order to rebalance maintenance traffic among the plurality of physical ports in response to occurrence of an event.

5. A network element according to claim 4, wherein the event includes at least one of: addition of another maintenance entity configured to communicate management traffic via the link aggregation group, deletion of one of the plurality of maintenance entities, increase in bandwidth requirement of one or the plurality of maintenance entities, another member port of the link aggregation group becoming active, and one of the plurality of ports becoming inactive.

6. A network element according to claim 4, the logic further configured to reassign a maintenance entity from the physical port with the highest bandwidth utilization to the physical port with the lowest bandwidth utilization.

7. A network element according to claim 6, wherein the maintenance entity reassigned is the maintenance entity with the highest bandwidth utilization that is assigned to the physical port with the highest bandwidth utilization.

8. A network element according to claim 1, wherein the logic comprises a master control unit.

9. A method comprising:
    configuring a plurality ports as member ports of a link aggregation group;
    configuring the link aggregation group to:
        communicate management traffic originating from a plurality of maintenance entities communicatively coupled to the link aggregation group; and
        communicate carrier traffic originating from other network elements communicatively coupled to the link aggregation group; and
    assigning individual maintenance entities of the plurality of maintenance entities to individual physical ports of the link aggregation group in order to balance maintenance traffic among the plurality of physical ports.

10. A method according to claim 9, wherein assigning individual maintenance entities of the plurality of maintenance entities to individual physical ports of the link aggregation group includes balancing maintenance traffic among the plurality of physical ports such that the management traffic communicated via each physical port is substantially equal.

11. A method according to claim 9, wherein at least one of the plurality of maintenance entities includes a Maintenance Entity Group End Point (MEP).

12. A method according to claim 9, further comprising reassigning individual maintenance entities of the plurality of maintenance entities to individual physical ports of the link aggregation group in order to rebalance maintenance traffic among the plurality of physical ports in response to occurrence of an event.

13. A method according to claim 12, wherein the event includes at least one of: addition of another maintenance entity configured to communicate management traffic via the link aggregation group, deletion of one of the plurality of maintenance entities, increase in bandwidth requirement of one or the plurality of maintenance entities, another member port of the link aggregation group becoming active, and one of the plurality of ports becoming inactive.

14. A method according to claim 12, wherein reassigning individual maintenance entities of the plurality of maintenance entities to individual physical ports of the link aggregation group includes reassigning a maintenance entity from the physical port with the highest bandwidth utilization to the physical port with the lowest bandwidth utilization.

15. A method according to claim 14, wherein reassigning individual maintenance entities of the plurality of maintenance entities to individual physical ports of the link aggregation group includes further includes reassigning the maintenance entity with the highest bandwidth utilization that is assigned to the physical port with the highest bandwidth utilization.

16. A network comprising:
a plurality of maintenance entities;
a network element communicatively coupled to the maintenance entities, the network element comprising:
one or more network interfaces including, in the aggregate, a plurality of physical ports configured as member ports of a link aggregation group, wherein the link aggregation group is:
configured to communicate management traffic originating from the plurality of maintenance entities; and
configured to communicate carrier traffic originating from other network elements communicatively coupled to the network element;
wherein the network element is configured to assign individual maintenance entities of the plurality of maintenance entities to individual physical ports of the link aggregation group in order to balance maintenance traffic among the plurality of physical ports.

17. A network according to claim 16, wherein the network element is further configured to balance management traffic among the plurality of physical ports such that the management traffic communicated via each physical port is substantially equal.

18. A network according to claim 16, wherein at least one of the plurality of maintenance entities includes a Maintenance Entity Group End Point (MEP).

19. A network according to claim 16, wherein the network element is further configured to reassign individual maintenance entities of the plurality of maintenance entities to individual physical ports of the link aggregation group in order to rebalance maintenance traffic among the plurality of physical ports in response to occurrence of an event.

20. A network according to claim 19, wherein the event includes at least one of: addition of another maintenance entity configured to communicate management traffic via the link aggregation group, deletion of one of the plurality of maintenance entities, increase in bandwidth requirement of one or the plurality of maintenance entities, another member port of the link aggregation group becoming active, and one of the plurality of ports becoming inactive.

21. A network according to claim 19, the network element further configured to reassign a maintenance entity from the physical port with the highest bandwidth utilization to the physical port with the lowest bandwidth utilization.

22. A network according to claim 21, wherein the maintenance entity reassigned is the maintenance entity with the highest bandwidth utilization that is assigned to the physical port with the highest bandwidth utilization.

* * * * *